No. 672,842. Patented Apr. 23, 1901.
J. H. & E. F. PORTER.
SELF LEVELING BERTH.
(Application filed Aug. 11, 1900.)
(No Model.) 4 Sheets—Sheet 1.
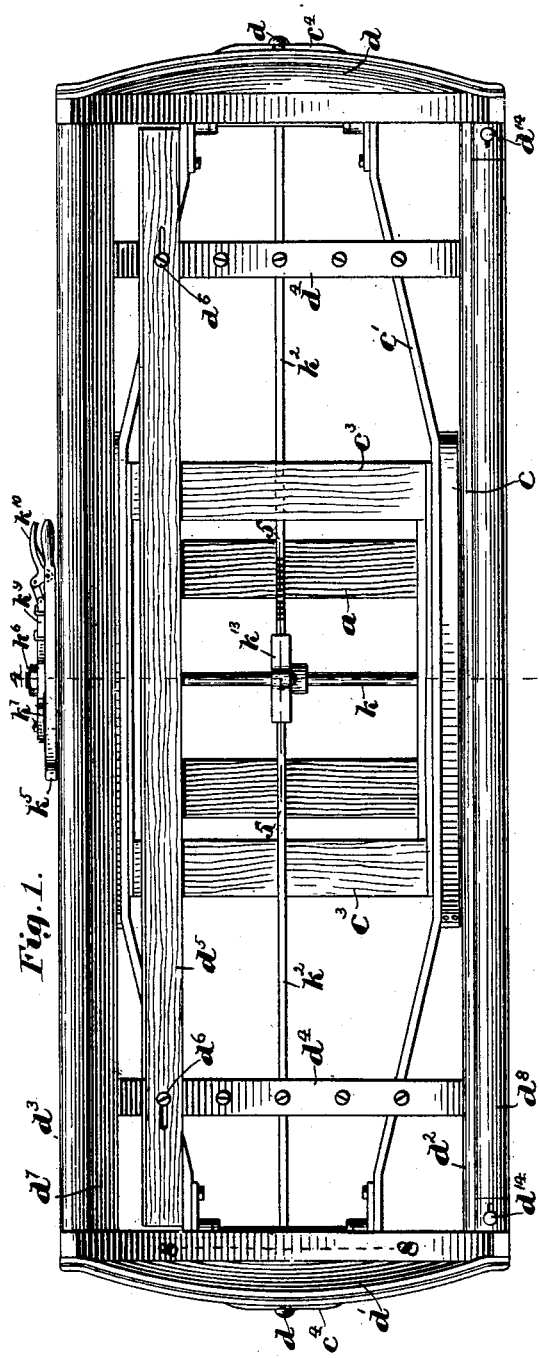
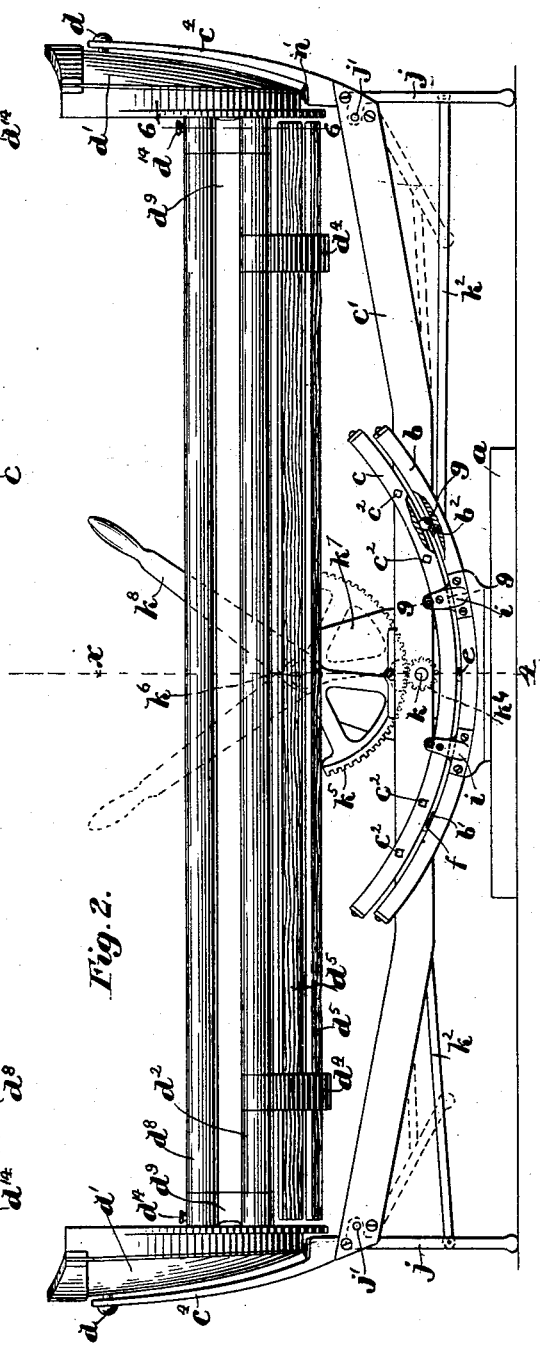
Witnesses:
Inventors
J. H. Porter
E. F. Porter
by Might Brown & Quinby
Attys.

No. 672,842. Patented Apr. 23, 1901.
J. H. & E. F. PORTER.
SELF LEVELING BERTH.
(Application filed Aug. 11, 1900.)
(No Model.) 4 Sheets—Sheet 2.
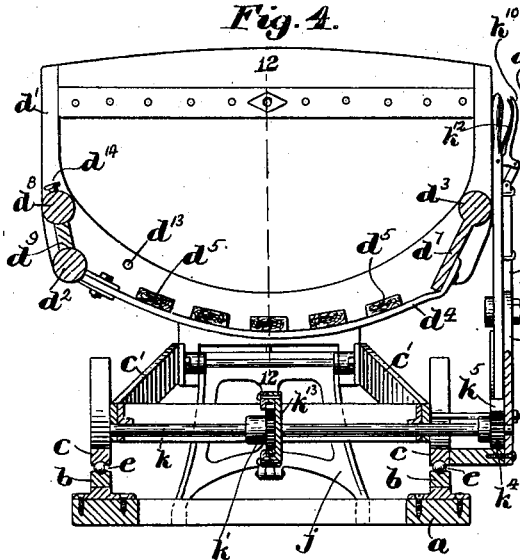
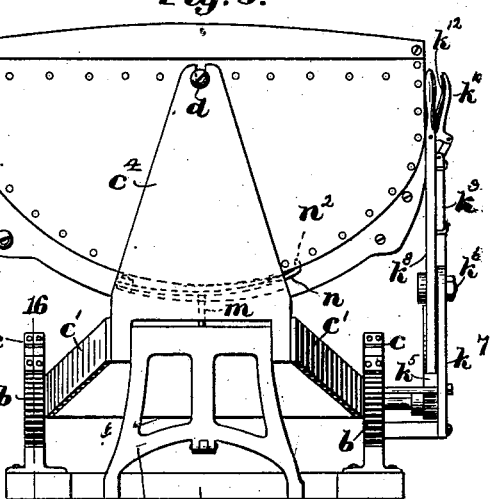
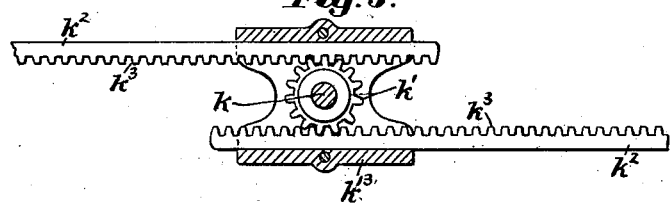
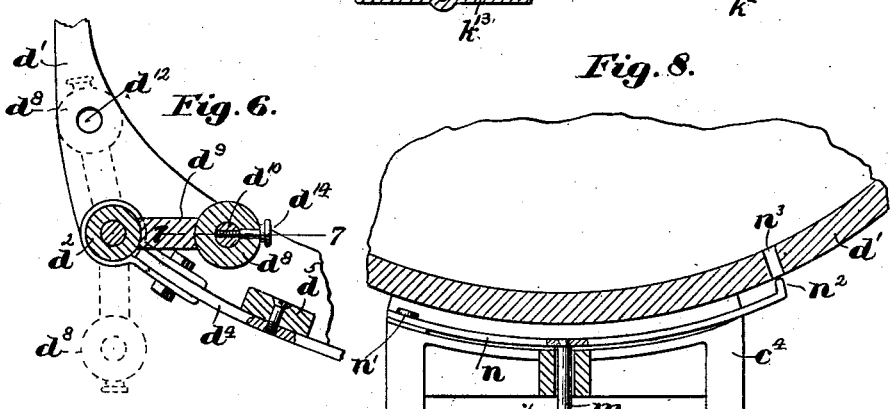
Witnesses:
Walter E. Lombard
O. H. Leggett
Inventors
J. H. Porter
E. F. Porter
by Might Brown & Quinby
Attys.

No. 672,842. Patented Apr. 23, 1901.
J. H. & E. F. PORTER.
SELF LEVELING BERTH.
(Application filed Aug. 11, 1900.)
(No Model.) 4 Sheets—Sheet 3.
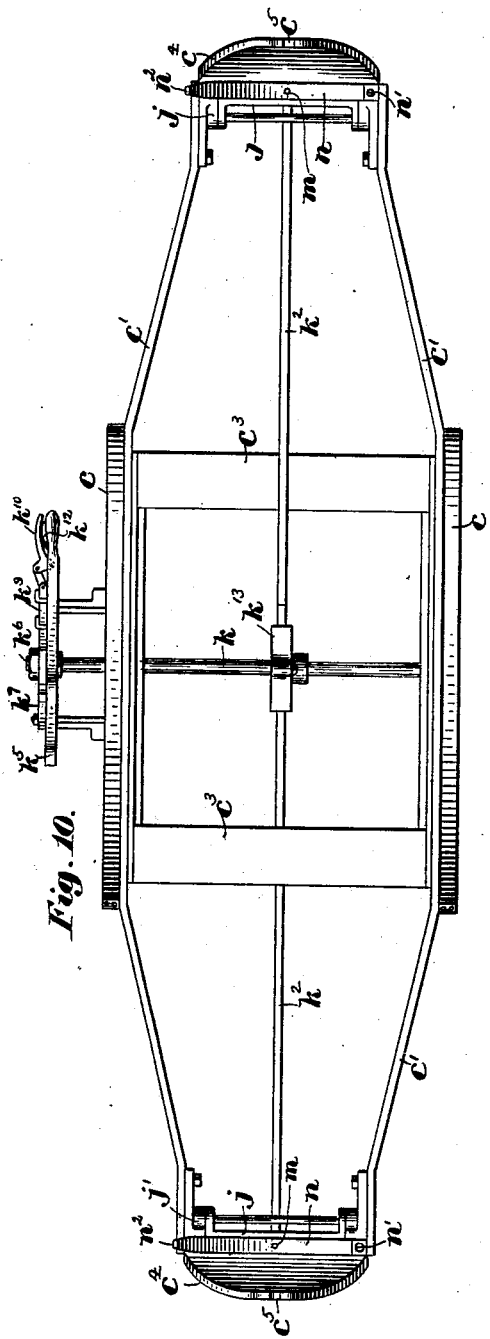
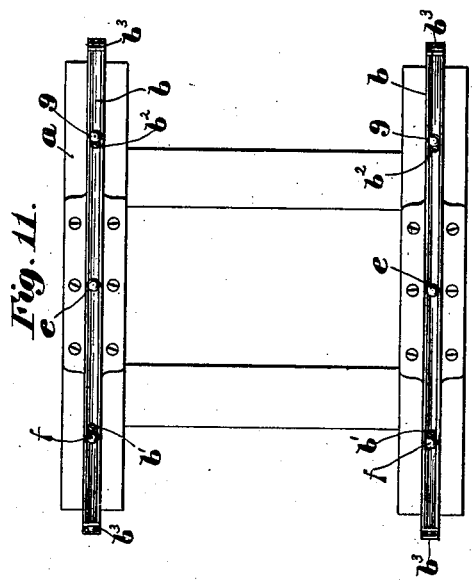
Witnesses:
Inventors
J. H. Porter
E. F. Porter
by Wright Brown & Quinby
Attys.

No. 672,842.  
Patented Apr. 23, 1901.
J. H. & E. F. PORTER.
SELF LEVELING BERTH.
(Application filed Aug. 11, 1900.)
(No Model.)
4 Sheets—Sheet 4.
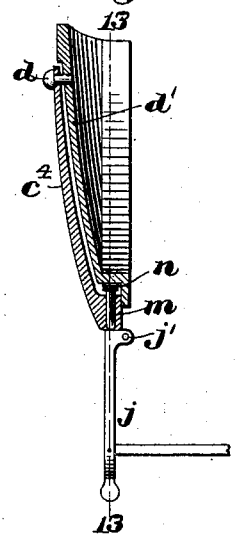
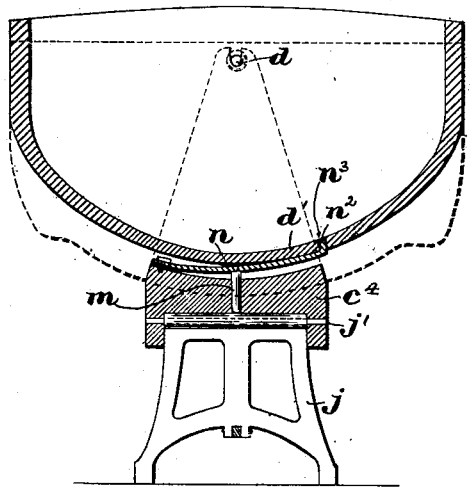
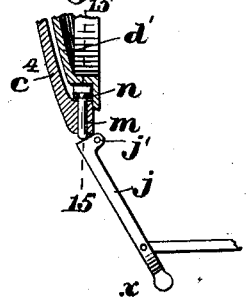
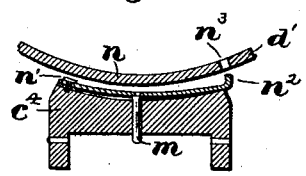
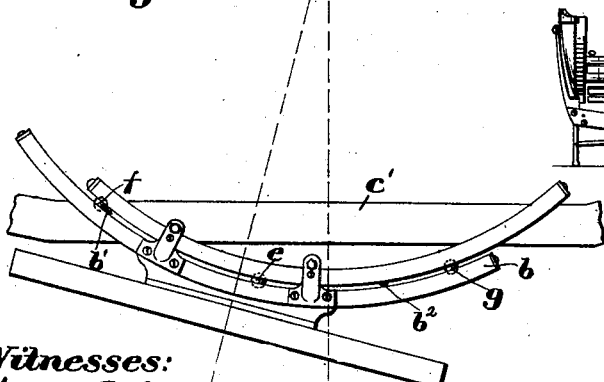
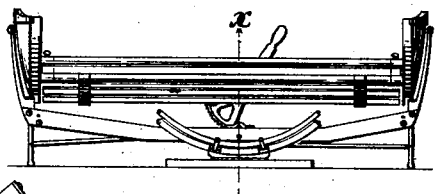
Witnesses:
Walter E. Lombard
Inventors
J. H. Porter
E. F. Porter
by Wright, Brown & Quinby Attys.

UNITED STATES PATENT OFFICE.

JAMES H. PORTER, OF EAST BOSTON, AND EDWIN F. PORTER, OF DORCHESTER, MASSACHUSETTS.

SELF-LEVELING BERTH.

SPECIFICATION forming part of Letters Patent No. 672,842, dated April 23, 1901.

Application filed August 11, 1900. Serial No. 26,588. (No model.)

*To all whom it may concern:*

Be it known that we, JAMES H. PORTER, of East Boston, and EDWIN F. PORTER, of Dorchester, in the county of Suffolk and State of Massachusetts, have invented certain new and useful Improvements in Self-Leveling Berths, of which the following is a specification.

This invention has for its objects, first, to provide a self-leveling berth adapted to maintain a substantially level position under all the conditions to which it is liable to be subjected, and, secondly, to provide improved means for conveniently locking and releasing the berth.

The invention consists of certain improvements of construction and arrangement of parts, as illustrated upon the accompanying drawings, fully described in the following specification, and pointed out with particularity in the claims hereto appended.

Of the drawings, Figure 1 represents a plan view of a self-leveling berth embodying our invention. Fig. 2 represents a side elevation of the same. Fig. 3 represents an end elevation. Fig. 4 represents a section on line 4 4, Figs. 1 and 2. Fig. 5 represents a section on line 5 5, Fig. 1, on an enlarged scale. Fig. 6 represents a section on line 6 6, Fig. 2. Fig. 7 represents a section on line 7 7, Fig. 6. Fig. 8 represents a section on line 8 8, Fig. 1. Fig. 9 represents a section on line 9 9, Fig. 2. Fig. 10 represents a plan view of the berth-frame, the berth being removed therefrom. Fig. 11 represents a plan view of the track-rails and their supporting-frame. Fig. 12 represents a section on line 12 12, Fig. 4. Fig. 13 represents a section on line 13 13, Fig. 12. Fig. 14 represents a view similar to Fig. 12, showing a different adjustment. Fig. 15 represents a section on line 15 15, Fig. 14. Fig. 16 represents a section on line 16 16, Fig. 3, showing the relative positions of the grooved rails when the berth-frame is inclined. Fig. 17 represents a side view of the berth on a reduced scale.

The same reference characters indicate similar parts or features in all the figures.

In the drawings, $a$ represents a bed-plate or base secured rigidly to the floor of a stateroom or other fixed support which moves with the vessel.

$b\ b$ represent segmental grooved supporting rails or tracks affixed rigidly to the base and extending lengthwise of the berth, the grooved upper surfaces of said rails being segments of a circle whose center $x$, Fig. 2, is preferably somewhat higher than the body of a person lying in the berth.

$c\ c$ represent segmental rails which are parts of an oscillatory berth-supporting frame and are concentric with the supporting-rails $b\ b$, the under surfaces of the rails $c\ c$ being grooved to coöperate with the grooved upper surfaces of the supporting-rails $b\ b$ in confining between the grooved surfaces of the two pairs of rails two series of balls $e\ f\ g$. The rails $b\ b$ and $c\ c$ are so arranged relatively to the berth that the berth is adapted to oscillate in the direction of its length on the center $x$.

The berth-supporting frame, of which the rails $c\ c$ form parts, comprises a framework having a depressed central portion to which the rails $c\ c$ are affixed and raised end portions having bearings for trunnions $d\ d$ affixed to the ends of the berth, said trunnions and their bearings being at substantially the same height as the center of the circle formed by the grooved upper surfaces of the supporting-rails $b\ b$ and arranged to permit the berth to oscillate sidewise. The berth is therefore adapted to oscillate both lengthwise and sidewise, so that, in effect, the berth remains level or horizontal and does not partake of the longitudinal and lateral oscillating movements of the vessel.

The supporting-frame of the berth comprises longitudinal side bars $c'\ c'$, affixed to the rails $c\ c$ by bolts $c^2$ and inclined upwardly from the lower portions of the rails, as shown in Fig. 2, end pieces $c^4\ c^4$, affixed to the ends of the bars $c'\ c'$, and intermediate cross-bars $c^3\ c^3$. The end pieces $c^4$ project upwardly from the side bars $c'\ c'$ and have bearings $c^5\ c^5$, Fig. 10, in their upper portions for the berth-trunnions $d\ d$.

The berth comprises the end pieces $d'\ d'$, one constituting the head and the other the foot of the berth, the trunnions $d\ d$ being attached to said end pieces, longitudinal outer and inner side bars $d^2$ $d^3$, affixed to and connecting the end pieces $d'$ $d'$, and a suitable mattress-support or bed-bottom held in place by the side bars $d^2$ $d^3$. As here shown, the said bed-bottom comprises transverse curved strips $d^4$ $d^4$, attached to the side bars $d^2$ $d^3$, and longitudinal slats $d^5$, attached by screws $d^6$ to the strips $d^4$, the mattress resting on said slats; but it is obvious that the bed-bottom may be of any other suitable construction and may have provisions for yieldingly supporting the mattress.

The preferred construction of berth in the embodiment of our invention here shown includes a flange $d^7$, attached to and projecting downwardly from the inner side bar $d^3$, the latter being elevated above the bed-bottom, so that the flange $d^7$ constitutes a retaining-wall for the inner edge of the mattress, the transverse strips $d^4$ being attached to said flange, as shown in Fig. 4. The said preferred construction also includes a supplemental movable side bar $d^8$, which is elevated above the bed-bottom and above the outer side bar $d^2$ and is affixed to arms $d^9$ $d^9$, which are adapted to swing, so that the movable bar $d^8$ can occupy different positions, as shown in Fig. 6—that is to say, the movable bar $d^8$ can be held, first, in an elevated position, as shown in Figs. 2 and 4 and by dotted lines in Fig. 6, to bear on the outer edge of the mattress and retain the latter in place when the berth is used for sleeping purposes; secondly, in a depressed position over the bed-bottom, as shown by full lines in Fig. 6, to enable the berth to be used as a seat, (the outer edge of the mattress being then placed above the bar $d^8$, if desired,) and, thirdly, in a depressed position below the bar $d^2$, as shown by dotted lines in Fig. 6, either to enable the berth to be used as a seat or to facilitate the operation of making the bed. The movable bar $d^8$ is provided with spring-pressed bolts $d^{10}$, Fig. 7, in its ends adapted to engage sockets $d^{12}$ $d^{13}$, Figs. 4 and 6, in the end pieces of the berth to lock the bar $d^8$ either in the elevated position shown in Fig. 4 or in the inwardly-displaced position shown in Fig. 6, said bolts having handles $d^{14}$.

The fixed segmental rails $b$ $b$ have stops $b'$ $b^2$ between their ends and central portions, as shown in Fig. 11, said stops retaining the balls $f$ $g$ in the end portions of the grooves of the rails and preventing them from coming too close to the central balls $e$, which occupy the lowest portion of the grooves. Said stops therefore insure a sufficient separation between the central ball $e$ and either of the end balls $f$ $g$ to cause the balls to adequately support the berth-frame and berth when the vessel is pitching lengthwise, as will be seen by reference to Fig. 16, where the rails $b$ are shown displaced from their normal position by fore-and-aft inclination of the vessel, the balls $f$ at the higher end of the rails $b$ being arrested by the stops $b'$, while the balls $g$ have receded from the stops $b^2$ and coöperate with the balls $e$ in supporting the berth-frame and berth, the center of gravity of the said parts being between the balls $e$ and $g$. When the vessel is inclined in the opposite direction, the balls $g$ are arrested by the stops $b^2$, and the balls $f$ recede from the stops $b'$ and coöperate with the balls $e$ in supporting the berth-frame and berth. The ends of the rails $b$ $b$ are provided with stops $b^3$, which prevent the balls $f$ and $g$ from leaving the ends of said rails.

It is preferable that when the berth-frame is supported by the central balls $e$ and two of the end balls, as shown in Fig. 16, the stop-arrested end balls shall be entirely relieved from pressure and be practically out of contact with the rails $c$ $c$, so that said balls, whose free rotation is prevented by the stops, will not impede the swinging movement of the berth-frame. This result is best accomplished by making the rails $c$ $c$ slightly eccentric to the rails $b$ $b$, so that the end portions of the rails $c$ $c$ will be slightly more separated from the rails $b$ $b$ than the central portions. This arrangement will cause the elevated end balls to be relieved from pressure, the depressed end balls and the central balls being under pressure. The same result may be secured by making the diameter of the central balls slightly greater than that of the end balls, the surfaces of the rails being parallel or concentric. The enlargement of the central balls will cause the berth-frame to tilt slightly onto the depressed end balls when the parts are in the position shown in Fig. 16, thus relieving the elevated end balls from pressure. The degree of eccentricity of the rails $c$ $c$ and the equivalent increase in the diameter of the central balls is too slight to admit of illustration in a drawing of the scale here necessary.

The balls $e$, $f$, and $g$, engaged partly with the rails $b$ and partly with the rails $c$, prevent lateral displacement of the rails $c$ and of the berth-frame relatively to the rails $b$. To assist in preventing such lateral displacement and to prevent vertical displacement, I provide brackets $i$ $i$, which are affixed to the rails $b$ and are formed at their upper ends to project over the rails $c$, as shown in Fig. 9. Rolls $i'$, mounted on the upper ends of the brackets $i$, bear on the upper sides of the rails $c$ and prevent them from being raised from the balls. Rolls $i^2$, journaled in studs $i^3$, inserted in the brackets $i$, bear against the outer sides of the rails $c$. The rolls $i'$ and $i^2$ are in rolling contact with the rails $c$ and retain them in place without interfering with the relative movements of the rails $b$ and $c$.

Means are provided for locking the berth to its supporting-frame to prevent lateral swinging of the berth and for rigidly supporting or locking the berth-frame to the vessel to prevent its longitudinal oscillations. As here shown, the means for locking the berth to the frame and the frame to the vessel operate simultaneously, so that a single movement of a lever locks both the berth and the frame. The frame-locking devices comprise legs or standards $j\ j$, hinged at $j'\ j'$ to the frame and adapted to be adjusted to bear simultaneously on the floor below the frame, as shown in full lines in Fig. 2, thus rigidly supporting the frame, and also adapted to be swung upwardly, as shown in dotted lines, thus clearing the floor, so that the frame is free to oscillate. The legs $j\ j$ are adjustable simultaneously by means of a rock-shaft $k$, journaled in bearings on the berth-frame, a pinion $k'$, affixed to said shaft, and rods $k^2\ k^2$, hinged at their outer ends to the legs $j\ j$ and having rack-teeth $k^3$ at their inner ends meshing with the pinion $k'$, as shown in Fig. 5, the arrangement being such that when the shaft $k$ is turned in one direction the rods $k^2$ are drawn inwardly and move the legs from the full-line to the dotted-line positions shown in Fig. 2, an opposite movement of the shaft moving the legs from the dotted-line to the full-line positions. The shaft $k$ is provided at one end with a pinion $k^4$, Fig. 4, meshing with a gear-segment $k^5$, which is pivoted at $k^6$ to a bracket $k^7$ on the inner side of the berth-frame and is provided with a lever $k^8$, which stands at the inner side of the berth. Movements of the lever cause the described adjustments of the legs through the intermediate mechanism. The lever is provided with a locking-dog $k^9$, adapted to engage notches in the bracket $k^7$ to hold the legs in either of the positions shown, the dog being operated by a handle $k^{10}$ and a spring $k^{12}$, Fig. 3. The rods $k^2$ are guided and held in engagement with the pinion $k'$ by means of a flanged plate $k^{13}$, which is mounted to oscillate on the shaft $k$. The pivots $j'$, that connect the legs $j$ with the berth-frame, are offset from the legs, as shown in Figs. 12 and 14, so that the upper ends of the legs constitute shoulders bearing on the lower ends of pins $m$, fitted to slide vertically in guides in the end pieces $c^4$ of the berth-frame. Said pins bear on spring-arms $n$, which are affixed at $n'$ to the end pieces $c^4$ and have dogs $n^2$ on their free ends, adapted to enter orifices $n^3$ in the end pieces $d'$ of the berth. When the legs $j$ are displaced, as shown in Fig. 14 and in dotted lines in Fig. 2, they permit the spring-arms $n$ to occupy their normal positions, the dogs $n^2$ being depressed, as shown in Fig. 15. When the legs are moved to their vertical positions to lock the berth-frame, their shoulders press the pins $m$ upwardly and cause the dogs $n^2$ to enter the orifices $n^3$, as shown in Fig. 13, thus locking the berth to the frame.

It will be seen that by the described mechanism the berth may be locked and held rigidly until the occupant is installed in it and then unlocked and made self-leveling by a movement of the lever, which is located so that it can be readily moved by the occupant of the berth.

The center of gravity of the human body in a recumbent position is nearer the head than the feet, and to compensate for this difference of distance we prefer to locate the center $x$ of the longitudinal oscillations of the berth-frame and berth nearer to the head than the foot of the berth, as shown in Fig. 17, thus obviating the necessity of adding weights to the foot of the berth.

Having thus explained the nature of the invention and described a way of constructing and using the same, although without attempting to describe all of the forms in which it may be made or all of the modes of its use, we declare that what we claim is—

1. An apparatus of the character specified, comprising segmental grooved track-rails having stops subdividing their grooves, a berth-frame having complemental grooved rails, balls interposed between the track-rails and the frame-rails, the end balls being confined against movement toward the central balls by the said stops, and a berth pivotally connected with the frame.

2. An apparatus of the character specified, comprising a berth-frame, a berth pivotally connected therewith to oscillate sidewise and an antifrictional supporting structure permitting the berth-frame to oscillate longitudinally, and comprising fixed segmental grooved track-rails having ball-stops, complemental grooved rails affixed to the berth-frame, and balls interposed between the track-rails and the frame-rails, the balls elevated by a longitudinal movement of the vessel being arrested by stops in the track-rails, the said structure having provisions for relieving pressure on the said elevated and arrested balls.

3. An apparatus of the character specified, comprising segmental grooved track-rails, a berth-frame having complemental grooved rails, balls interposed between the track-rails and the frame-rails, brackets affixed to the track-rails and having antifriction-rolls bearing on the frame-rails, and a berth pivotally connected with the frame.

4. An apparatus of the character specified, comprising a berth-frame, supporting means therefor having provisions for permitting longitudinal oscillations of the frame, legs pivoted to the end portions of the frame, means for adjusting the legs simultaneously to lock and release the frame, a berth pivotally connected with the frame, and means for locking the berth to the frame.

5. An apparatus of the character specified, comprising a berth-frame, supporting means therefor having provisions for permitting longitudinal oscillations of the frame, a berth pivotally connected with the frame, devices for locking the berth to the frame, and frame-locking mechanism connected with the berth-locking devices to operate simultaneously therewith.

6. An apparatus of the character specified, comprising a berth-frame, supporting means therefor having provisions for permitting longitudinal oscillations of the frame, legs pivoted to the end portions of the frame and having shoulders which are moved by movements of the legs, and berth-locking devices which are movable by said shoulders, a berth pivotally connected with the frame and adapted to be locked to the frame by said locking devices, and means for adjusting the legs to lock and release both the frame and the berth.

7. An apparatus of the character specified, comprising a berth-frame, supporting means therefor having provisions for permitting longitudinal oscillations of the frame, legs pivoted to the end portions of the frame, a transverse rock-shaft journaled in the frame, rods extending from the legs to the rock-shaft, and operating connections between the rods and rock-shaft.

8. An apparatus of the character specified, comprising a berth-frame, supporting means therefor having provisions for permitting longitudinal oscillations of the frame, legs pivoted to the end portions of the frame, a transverse rock-shaft journaled in the frame, rods extending from the legs to the rock-shaft, operating connections between the rods and rock-shaft, an operating-lever connected with the rock-shaft, and means for locking said lever in different positions.

9. An apparatus of the character specified, comprising a berth-frame, supporting means therefor having provisions for permitting longitudinal oscillations of the frame, legs pivoted to the end portions of the frame, a transverse rock-shaft journaled in the frame, rods extending from the legs to the rock-shaft and provided with rack-teeth meshing with a pinion on the rock-shaft, and a flanged guide-plate pivoted on the shaft and holding the rack-teeth in engagement with the pinion.

10. An apparatus of the character specified, comprising a berth, a supporting-frame to which the berth is pivoted to oscillate laterally, an antifrictional supporting structure which permits longitudinal oscillations of the berth-frame and berth, means for locking the berth and the frame to prevent their oscillating movements, and a hinged front on the berth adapted to be displaced to permit the use of the berth as a seat when the berth is locked.

11. An apparatus of the character specified, comprising a berth, a supporting-frame to which the berth is pivoted to oscillate laterally, and an antifrictional supporting structure having provisions for permitting the berth-frame and berth to oscillate on a center which is nearer to the head of the berth than to its foot, whereby the center of gravity of the occupant is brought substantially into vertical alinement with the center of longitudinal oscillation of the berth-frame and berth.

In testimony whereof we have affixed our signatures in presence of two witnesses.

J. H. PORTER.
EDWIN F. PORTER.

Witnesses:
C. F. BROWN,
A. D. HARRISON.